May 28, 1940. R. A. SANDBERG 2,202,403
STRAINER ASSEMBLY FOR REFRIGERATION SYSTEMS
Filed May 13, 1937
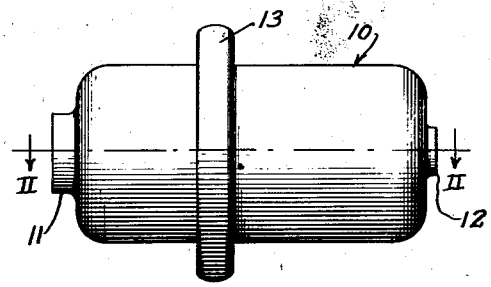
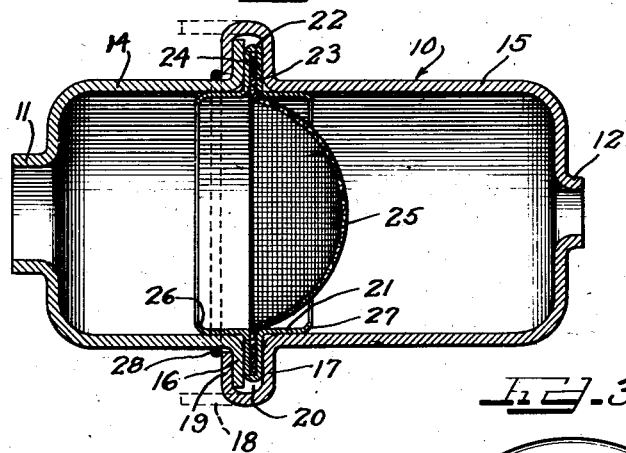
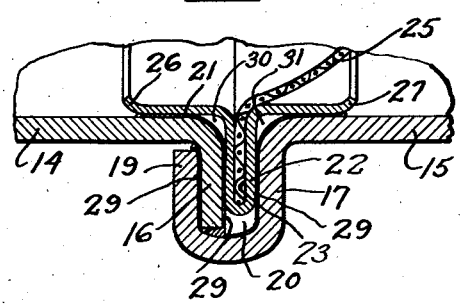
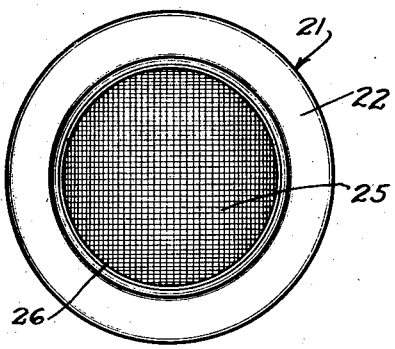
Inventor
RAY A. SANDBERG.
by Charles H. Sill Attys.

Patented May 28, 1940

2,202,403

UNITED STATES PATENT OFFICE 2,202,403

STRAINER ASSEMBLY FOR REFRIGERATION SYSTEMS

Ray A. Sandberg, Waukegan, Ill., assignor, by mesne assignments, to Houdaille-Hershey Corporation, Detroit, Mich., a corporation of Michigan Application May 13, 1937, Serial No. 142,396

3 Claims. (Cl. 210—164)

This invention relates to a strainer for refrigerant material adapted to be mounted in a refrigerator system. The invention includes a method of making the strainer.

More specifically, this invention relates to a brazed together strainer assembly having a wire screen protected from brazing material used in uniting the parts of the assembly.

Most refrigeration systems require a refrigerant strainer interposed somewhere in the path of flow of refrigerant to remove dirt, or other impurities from the refrigerant. These strainer assemblies must be leak-proof. Since the strainer itself is usually a wire screen, it is difficult to secure complementary parts of the housing for the screen in air-tight relation without clogging the screen with soldering or brazing material necessary for uniting the housing parts in air-tight relation.

According to this invention, the strainer housing is made from two complementary drawn or stamped metal cup-shaped members united together by brazing material. The screen is protected from the brazing material by a sleeve disposed in the cup members within the brazing area. The screen itself may be securely clamped in the sleeve member and thus rigidly held in the housing.

It is then an object of this invention to provide a brazed together strainer assembly with means protecting the strainer against clogging by brazing material.

A further object of this invention is to provide a brazed or soldered together strainer assembly having the strainer screen seated in a separate sleeve member which protects the screen against clogging by brazing material.

Another object of this invention is to form a strainer housing from two metal cup-shaped members adapted to be brazed together and to protect the strainer screen from being clogged by the brazing material.

Another object of this invention is to provide an improved method of securing strainer screens in metal housings formed from two complementary members.

Another object of this invention is to provide a process of protecting screen material from brazing flux.

A further object of this invention is to protect a metal screen disposed within a brazing area from clogging by brazing material.

Other and further objects of this invention will become apparent to those skilled in the art from the following detailed description of the annexed sheet of drawings which discloses a preferred embodiment of the invention.

On the drawing:

Figure 1 is a side elevational view of a strainer assembly according to this invention.

Figure 2 is an enlarged cross-sectional view taken substantially along the line II—II of Figure 1.

Figure 3 is a plan view of the strainer screen mounted in the sleeve shown in Figure 2.

Figure 4 is a greatly enlarged fragmentary cross-sectional view of the brazed joint securing the housing members together in leak-proof relation and illustrating the manner in which the sleeve member protects the screen against clogging.

As shown on the drawing:

In Figure 1 the reference numeral 10 designates generally the housing for the strainer of this invention. The housing 10 has outturned annular flanges 11 and 12 at the ends thereof defining openings giving entrance to the housing. A rim 13 is formed intermediate the ends of the housing.

As is shown in Figure 2, the housing 10 comprises cup-shaped members 14 and 15 mounted in opposed relation. The members 14 and 15 are stamped or drawn from sheet metal.

The cup member 14 has an outturned annular flange 16 at the open top thereof.

The cup member 15 has an outturned annular flange 17 provided with a peripheral rim 18 adapted to be crimped or spun over the flange 16 of the cup member 14 as shown at 19 to provide a seam for holding the cup members 14 and 15 in opposed relation to define the housing 10. The crimped flange 17 defines the rim 13 described in Figure 1 and provides, with the flanges 16 and 17, an annular groove 20 in the housing.

A cylindrical sleeve member 21 is mounted in the housing 10. The sleeve member has the wall thereof bowed outwardly as at 22 intermediate the ends of the sleeve. The outwardly bowed walls define therebetween a groove 23 for receiving the peripheral edges 24 of a screen 25. The screen as shown in Figure 2 extends across the sleeve and may be semi-spherical in shape as shown. The peripheral edges 24 of the screen are securely clamped in the groove 23 by the outwardly bowed walls 22 of the sleeve.

Lips 26 and 27 extend inwardly from both ends of the sleeve 21 in spaced relation from the cup members 14 and 15 respectively.

As shown in Figure 2, the sleeve 21 snugly fits in the cup members 14 and 15 and has the intermediate portion thereof aligned with the groove 20 between the cup members.

The lips 26 and 27 of the sleeve, however, extend beyond the groove 20 into spaced relation therefrom.

While the cup members 14 and 15 are held together by the crimped or spun member 19, the interior of the housing must be absolutely leak-proof to prevent the loss of refrigerant. The seam alone is not sufficient to render the housing leak-proof. It is thus necessary to integrally secure the cup members 14 and 15 together in leak-proof relation.

According to this invention a wire 28, as shown in Figure 2, composed of brazing material such as copper, bronze, or the like suitable brazing alloys, is disposed around the cup member 14 adjacent the portion 19 of the seam, as shown in Figure 2. The entire assembly is then placed in a brazing furnace and heated to brazing temperatures under non-oxidizing or reducing conditions such as, for example, in a hydrogen atmosphere.

As best shown in Figure 4, the brazing wire 28 melts in the brazing furnace and flows by capillary action between all contiguous surfaces of metal forming the assembly. The films formed by the brazing material are designated by the reference numerals 29 in Figure 4. These films 29 alloy with the metal surfaces and integrally unite the same together.

Due to the tenacious capillary attraction of the brazing metal for the metal forming the assembly these films 29 flow between all contiguous surfaces of the metal and would rapidly clog the screen 25 unless special precautions are taken to prevent such clogging action. According to this invention, the sleeve 21 serves this purpose of preventing a clogging of the screen. As shown in Figure 4, the films 29 may even flow between the sleeve 21 and the cup members 14 and 15 but the inwardly turned lips 26 and 27 of the sleeve provide wide spaces between the cups 14 and 15 and the sleeve thus breaking the capillary flow of the films 29 and preventing these films from reaching the screen.

As best shown in Figure 4, the sleeve 21 is spaced from the tops of the cups at the points where the flanges 16 and 17 extend from the cups because the curvatures on the sleeve do not match with the curvature on the cups. This construction provides gaps 30 and 31 which serve as an added protection against flow of brazing material to the screen. The gaps break the contiguous surfaces between which the films 29 flow.

According to this invention, therefore, a brazing operation can be used to unite together housing members in leakproof relation for defining a housing for a metal screen which under normal brazing operations will attract the brazing material and become clogged therewith. According to this invention, the flow of brazing material into contact with the metal screen is prevented and screens of any metal can be used in the assembly.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A strainer assembly comprising complementary metal cups having outturned flanges at their open ends and apertures through their closed ends, the flange of one cup being crimped around the flange of the other cup to secure the cups together for defining a housing, a sleeve disposed in said housing having the wall thereof bowed outwardly intermediate the ends of the sleeve to define a rim, said rim being disposed between the flanges of the cups, a wire screen extending across said sleeve and having the peripheral edges thereof secured between the outwardly bowed walls of the sleeve and a film of brazing material between the flanges of the cup members for rendering the housing air-tight, said sleeve being formed to provide a space between it and said housing for protecting said screen from the brazing material.

2. A strainer assembly which comprises a cup member having an outturned annular flange at the top thereof and an aperture through the bottom thereof, a second cup member having an outturned annular flange at the top thereof provided with a rim bent over the flange of the first cup member to hold the cup members together in opposed relation for forming a housing, said flanges being in spaced opposed relation and defining therebetween an annular groove, a sleeve member in said housing having an intermediate portion thereof bowed outwardly to define an annular rim seated in said groove, and a strainer extending across said sleeve having the peripheral edges thereof clamped between the outwardly bowed sleeve wall, said sleeve extending beyond both of the flanges of the cup members and having inturned lips on its ends spaced from the housing wall.

3. A strainer assembly comprising two hollow screen housing parts having juxtaposed portions formed to be connected by a soldered joint, a screen inside said parts having a peripheral portion extending into said joint and an intermediate member between said peripheral screen portion and said juxtaposed portions cooperating with said juxtaposed portions to define a capillary path for solder to flow through, said intermediate member having an inner edge portion removed from the capillar path and which is spaced from the cooperating wall of the adjoining housing part so that solder will not flow by capillar action beyond said inner edge portion.

RAY A. SANDBERG.